United States Patent
Yoshimura

(10) Patent No.: US 6,512,346 B2
(45) Date of Patent: Jan. 28, 2003

(54) MOTOR DRIVING APPARATUS

(75) Inventor: Satoshi Yoshimura, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/832,991

(22) Filed: Apr. 12, 2001

(65) Prior Publication Data

US 2001/0030524 A1 Oct. 18, 2001

(30) Foreign Application Priority Data

Apr. 13, 2000 (JP) ........................................ 2000-112212

(51) Int. Cl.[7] ............................................. G05B 11/28
(52) U.S. Cl. ...................... 318/599; 318/432; 318/434; 318/254; 388/928.1; 361/23; 361/30
(58) Field of Search ............................... 318/434, 432, 318/599, 254; 388/928.1; 361/19, 23, 30, 33

(56) References Cited

U.S. PATENT DOCUMENTS

| | | | | |
|---|---|---|---|---|
| 3,801,194 A | * | 4/1974 | Pelte et al. ..................... 352/91 |
| 4,651,922 A | * | 3/1987 | Noba ........................... 236/35 |
| 4,752,851 A | * | 6/1988 | Ritter ........................... 361/31 |
| 5,173,848 A | * | 12/1992 | Roof ............................. 363/56 |
| 5,448,143 A | * | 9/1995 | Pecone ........................ 318/434 |
| 5,506,539 A | * | 4/1996 | Kelly et al. .................. 327/379 |
| 6,016,965 A | * | 1/2000 | Yoshimura et al. ........... 236/35 |

FOREIGN PATENT DOCUMENTS

JP          56-141530          3/1980

* cited by examiner

Primary Examiner—Robert E. Nappi
Assistant Examiner—Rina I. Duda
(74) Attorney, Agent, or Firm—Law Offices of David G. Posz

(57) ABSTRACT

An error such as disconnection or short on the current path from said dc power supply to a switching element via the dc motor is detected by judging whether variation in a voltage at a junction point between the dc motor and the switching element tracks variation in the pulse width modulation signal for the switching element. If this is false for a predetermined interval, this apparatus judges there is the error. The error is judged by variation in a voltage at a junction point between the dc motor and the switching element tracks variation in the pulse width modulation signal, so that though the dc motor is driven by a fan for cooling the engine of a motor vehicle because of wind due to traveling of a motor vehicle, the error can be judged accurately.

9 Claims, 5 Drawing Sheets

MOTOR DRIVING APPARATUS

BACKGROUND OF THE INVENTION

1. Field of the Invention

This invention relates to a motor driving apparatus for driving a motor with error detection.

2. Description of the Prior Art

A motor driving apparatus for driving a dc motor as a power source of a cooling fan mounted on a motor vehicle, is known. In this motor driving apparatus, a switching element is provided on the line between the battery and a dc motor mounted on the motor vehicle. The switching element turns on and off with duty control, that is, pulse width modulation (PWM) to smoothly control the rotation speed of the dc motor.

Another motor driving apparatus with error detection such as disconnection of the line between the battery and the dc motor or shorting to the ground, is known. Japanese utility model application provisional publication No. 56-141530 discloses such a prior art motor driving apparatus including a resistor provided on the line between the dc motor and the battery. The error is judged by detecting whether the voltage difference between both ends of the resistor exceeds a predetermined voltage during driving the motor to detect whether or not the driving current normally flows.

FIG. 5A is a block diagram of the prior art motor driving apparatus having a current detection resistor. The current detection resistor RS is provided on the current path between the dc motor 2 and the battery 4. The voltage difference is detected by a disconnection/shorting detection circuit 60. In this circuit, the driving current flows through the current detection resistor Rs.

Another type of a prior art motor driving apparatus is shown in FIG. 5B. In this motor driving apparatus, a current detection resistor Rse is provided on a bypass line of the line between the dc motor and the ground. More specifically, a multi-drain FET is used for PWM switching. One drain is used for switching a main part of the driving current. Another drain passes a remaining part of the driving current. The remaining part of the driving current flows through the current detection resistor Rse. A disconnection/shorting detection circuit 61 detects the voltage difference. In this circuit, a part of the driving current flows through the current detection resistor Rse. Thus, power loss is reduced. In both motor driving apparatuses shown in FIGS. 5A and 5B, on occurrence of errors of disconnection and shorting, alarm signals are generated.

Moreover, in both motor driving apparatuses shown in FIGS. 5A and 5B, the dc motor 2 coupled to a cooling fan may be driven by the cooling fan due to wind. In this condition, the dc motor generates electromotive force that may reduce the driving current flowing through the dc motor. So the disconnection/shorting detection circuit 60 or 61 may erroneously detect error in the current path of the dc motor 2.

SUMMARY OF THE INVENTION

The aim of the present invention is to provide a superior motor driving apparatus.

According to the present invention, a first aspect of the present invention provides a dc motor driving apparatus comprising: switching means provided at a first current path between a dc power supply and a dc motor; control means for generating a pulse width modulation signal to turn on and off said switching means in response to a control signal; detection means for detecting a voltage at a second current path between said dc motor and said switching means, said first current path including said second current path; and judging means for judging whether said voltage from said detection means varies at a first cycle which is substantially the same as a second cycle of said pulse modulation signal and judging that there is an error on a third current path from said dc power supply to said switching means via said dc motor when said voltage from said detection means does not vary at said first cycle which is substantially the same as said second cycle of said pulse modulation signal.

According to the present invention, a second aspect of the present invention provides, in a motor driving apparatus comprising: switching means provided at a first current path between a dc power supply and a dc motor; control signal generating means in response to a control signal for setting a target driving voltage for said dc motor and generating a pulse width modulation signal for controlling a driving voltage for said dc motor toward said target driving voltage as a control signal; and driving means for rotating said dc motor by turning on and off said switching means in accordance with said control signal, the improvement comprising; detection means for detecting a voltage at a second current path between said dc motor and said switching means, said first current path including said second current path; and judging means for judging whether said voltage from said detection means varies at a first cycle which is substantially the same as a second cycle of said pulse modulation signal and judges that there is an error on a third current path from said dc power supply to said switching means via said dc motor when said voltage from said detection means does not vary at said first cycle which is substantially the same as said second cycle of said pulse modulation signal.

According to the present invention, a third aspect of the present invention provides a motor driving apparatus based on the first aspect, further comprising a resistor connected to electrodes of said switching means in parallel, wherein a resistance of said resistor is determined such that a current flowing through said resistor does not rotate said dc motor when said switching means is in an OFF condition.

According to the present invention, a fourth aspect of the present invention provides a motor driving apparatus based on the first aspect, wherein said judging means comprising: first judging means for judging whether variation in said voltage from said detection means tracks variation in a voltage of said control signal; and second judging means for monitoring an interval for which said variation of said detection voltage does not track said control signal and judging that there is said error on a current path from said dc power supply to said switching means via said dc motor when said interval exceeds a predetermined judging interval.

According to the present invention, a fifth aspect of the present invention provides a motor driving apparatus based on the first aspect, wherein said switching means comprises a plurality of switching elements, and said detection means comprising a plurality of detection elements, each of said switching elements provided at said first current path, each of said detection elements detects said voltage at said second current path, each of said first current paths including each of said second current paths, and said judging means judges that there is an error on any of said third current paths from said dc power supply to a plurality of said switching means via said dc motors when any of said voltages from said detection means does not vary at said first cycle which is substantially the same as said second cycle of said pulse modulation signal.

According to the present invention, a sixth aspect of the present invention provides a motor driving apparatus based on the first aspect, wherein said dc motor is mounted on a mobile unit and provided for rotating a fan which is further rotated by a wind generated by movement of said mobile unit.

According to the present invention, a seventh aspect of the present invention provides a motor driving apparatus based on the fifth aspect, wherein said dc motors are mounted on a mobile unit and provided for rotating fans, respectively, which are further rotated by wind generated by movement of said mobile unit.

According to the present invention, an eighth aspect of the present invention provides a motor driving apparatus comprising: switching means provided at a first current path between a dc power supply and a dc motor; control means for generating a pulse width modulation signal to turn on and off said switching means in response to a control signal; detection means for detecting a voltage at a second current path between said dc motor and said switching means, said first current path including said second current path; and judging means for judging whether said voltage from said detection means and said pulse width modulation signal correspondingly vary each other in variation cycle and judging that there is an error on a third current path from said dc power supply to said switching means via said dc motor when said voltage from said detection means and said pulse width modulation signal does not correspondingly vary each other in variation cycle.

According to the present invention, a ninth aspect of the present invention provides a motor driving apparatus comprising: switching means provided at a first current path between a dc power supply and a dc motor; control means for generating a pulse width modulation signal to turn on and off said switching means in response to a control signal; detection means for detecting a voltage at a second current path between said dc motor and said switching means, said first current path including said second current path; and judging means for judging whether variation in said voltage from said detection means tracks variation in said pulse width modulation signal and judging that there is an error on a third current path from said dc power supply to said switching means via said dc motor when said variation in said voltage from said detection means does not track said variation in said pulse width modulation signal.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

[First Embodiment]

Figure 1:
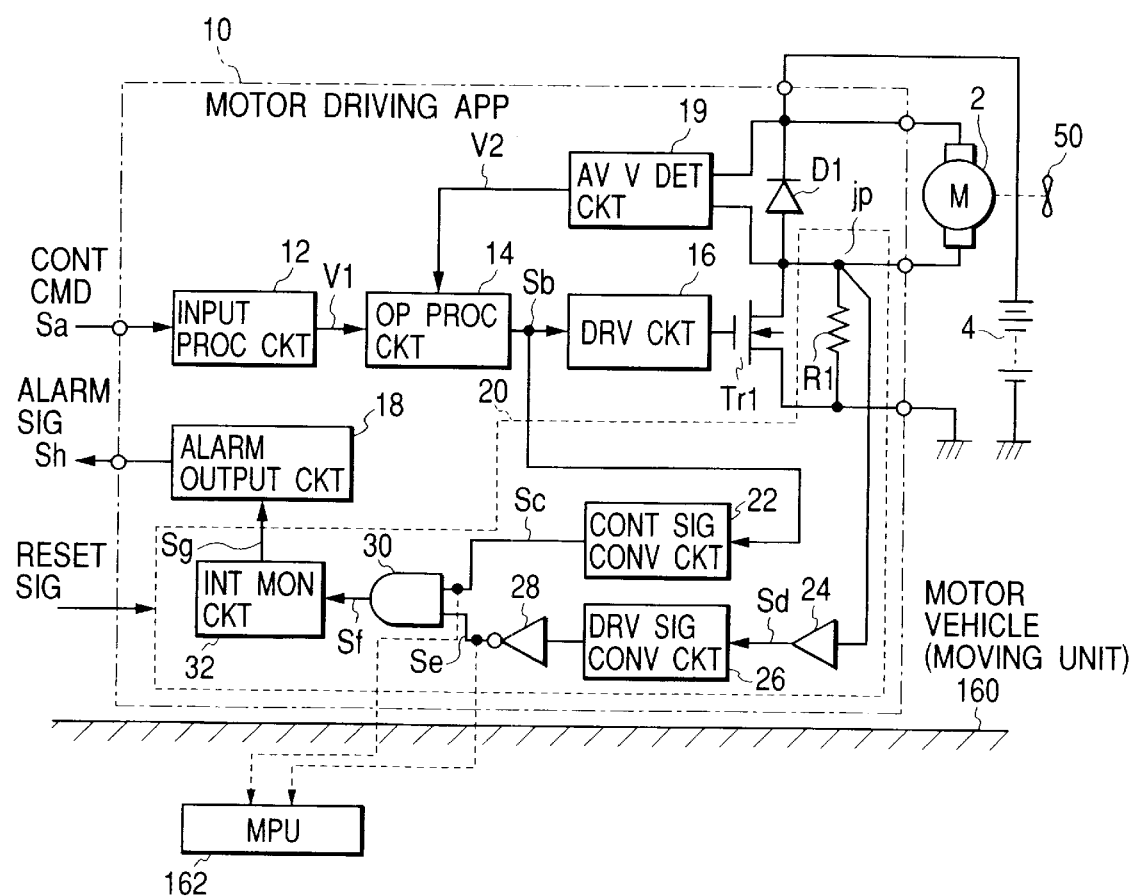
FIG. 1 is a block diagram of a motor driving apparatus according to a first embodiment of the present invention.

FIG. 1 is a block diagram of a motor driving apparatus according to a first embodiment of the present invention.

The motor driving apparatus 10 rotates a dc motor 2 for rotating a cooling fan 50 mounted on a motor vehicle 160 at a predetermined rotation speed. The motor driving apparatus 10 includes a switching element (transistor) Tr1 comprising an n-channel MOSFET provided as a low side switch at a current path between a battery 4 as a dc power source and the dc motor 2 and a diode D1 connected in parallel to the dc motor 2.

Further, the motor driving apparatus 10 includes an input processing circuit 12 for receiving a control command Sa, an average voltage detection circuit 19 for detecting a driving voltage V2 for the dc motor 2 (an average value of the voltage between terminals of the dc motor 2), an operation processing circuit 14 for outputting a control signal (PWM signal) Sb which is pulse-width-modulated for controlling rotation of the dc motor 2, and a driving circuit 16 for supplying a driving current to the dc motor 2 by turning on and off the transistor Tr1 in accordance with the control signal Sb to drive the dc motor 2, i.e., to rotate the dc motor 2.

The operation processing circuit 14 does not set the duty ratio of the control signal Sb such that the driving voltage V2 to the dc motor 2 is controlled toward the target driving voltage V1 corresponding to the control command Sa inputted from the input processing circuit 12, but stops supplying the control signal Sb when the driving voltage V2 detected by the average voltage detection circuit 19 exceeds the target driving voltage V1 (V2>V1) to turn off the transistor Tr1 to stop supplying the driving current to the dc motor 2.

More specifically, the input processing circuit 12 generates the target driving voltage V1 in accordance with the control command Sa. The operation processing circuit 14 generates the control signal Sb of which duty ratio is determined in accordance with the target driving voltage V1. The driving circuit 16 generates the driving signal corresponding to the control signal Sb. The dc motor 2 is driven at a constant voltage corresponding to the target voltage V1 when there is no disturbance. In this operation, when the driving voltage V2 detected by the average voltage detection circuit 19 exceeds the target driving voltage V1, it is judged that an electromotive force is generated at the dc motor 2 because the cooling fan 50 is rotated in the forward direction by the wind (disturbance) generated by traveling of the motor vehicle. Thus, turning on the transistor Tr1 in this condition is unnecessary. Accordingly, the operation processing circuit 14 inhibits unnecessary switching operation in the transistor Tr1 when the driving voltage V2 exceeds the target driving voltage V1.

The motor driving apparatus 10 further includes a disconnection/shorting detection circuit 20 for detecting disconnection and shorting on a current path from the battery 4 to the transistor Tr1 via the dc motor 2. The disconnection/shorting detection circuit 20 includes a control signal conversion circuit 22, a driving signal conversion circuit 26, and a resistor R1, an inverter 28 for inverting an output of the driving signal conversion circuit 26, an AND gate 30 for effecting AND operation between outputs of the signal conversion circuit 22 and the inverter 28, an interval monitoring circuit 32, and a buffer 24. The control signal conversion circuit 22 supplied with the control signal Sb from the operation processing circuit 14 detects whether the control signal Sb varies at a predetermined pulse width modulation cycle, and generates a control condition signal Sc (high) when the control signal Sb varies at the predetermined pulse width modulation cycle. That is, the control condition signal Sc indicates that the operation processing circuit 14 outputs the control signal Sb.

The driving signal conversion circuit 26 supplied with the voltage (voltage signal) at the junction point JP between the dc motor and the transistor Tr1, detects the cycle of variation in the voltage signal at the cycle which is substantially the same as that of the control signal SB, and outputs a driving condition signal (high) indicating that the dc motor 2 is driven by the transistor Tr1 with duty control when the junction voltage detection signal Sd varies at the cycle that is substantially same as that of the control signal Sb from the operation processing circuit 14, that is, when the junction voltage detection signal Sd varies with tracking the control signal Sb.

The resistor R1 is connected between the drain and the source of the transistor Tr1 to prevent the junction voltage detection signal Sd from varying when any of the current paths to the dc motor 2 is disconnected. The resistance value is so large that the dc motor 2 does not rotate by the current flowing through the resistor R1 when the transistor Tr1 turns off while the current path to the dc motor is normal. The buffer circuit 24 limits the amplitude of the voltage at the junction point to the voltage amplitude for the motor driving apparatus 10, so that the driving signal conversion circuit 26 can accurately judge the variation of the junction voltage detection signal Sd. Here, the buffer circuit 24 and the driving signal conversion circuit 26 act as a detection means of this invention.

The control condition signal Sc outputted from the control signal conversion circuit 22 is directly supplied to the AND gate 30. On the other hand, the driving condition signal from the driving signal conversion circuit 26 is inverted by the inverter 28. The inverted signal Se is supplied to the AND gate 30.

The AND gate 30 outputs the detection signal Sf (high) indicating that there is an error (disconnection or shorting) in the current path to the dc motor 2 when the control condition signal Sc is high and the driving condition signal Se is high.

The disconnection/shorting detection circuit 20 includes an interval monitoring circuit 32 for monitoring the continuous interval when the AND gate 30 outputs the detection signal Sf and judges that the current path of the dc motor 2 is disconnected or shorted when the AND gate 30 continuously outputs the detection signal Sf over a predetermined judging interval TD to output the judgment signal (high) indicating this condition.

The interval monitoring circuit 32 supplies the judgment signal Sg to the alarm outputting circuit 18 which supplies an alarm signal (high) Sh for turning on an alarm lamp or generates alarm sound to an external alarm unit to inform the driver of the error in the current path to the dc motor 2 when the judgment signal Sg is supplied.

FIGS. 2A to 2H show waveforms of respective signals in the motor driving apparatus 10.

When the control command Sa is supplied from an external control unit at a timing t1, the operation processing circuit 14 starts generating the PWM signal for rotating the dc motor 2 at a rotating speed corresponding to the control command Sa as a control signal Sb supplied to the driving circuit 16. As the result, the transistor Tr1 turns on and off at the predetermined cycle on the basis of the control signal Sb. If the current path to the dc motor 2 is normal, the junction point voltage detection signal Sd supplied to the driving signal conversion circuit 26 cyclically varies with the control signal Sb.

In this condition, the control condition signal Sc supplied to the AND gate 30 is high and the driving condition signal Se is low, so that the output Sf of the AND gate 30 becomes low. That is, the output Sf of the AND gate 30 does not output high level indicating an error condition on the current path.

In the condition shown in FIGS. 2A to 2H, it is assumed that the fan 50 driven by the dc motor 2 is rotated by the wind due to traveling of the motor vehicle while the dc motor is supplied with the driving current after the timing t1, the wind decreases at a timing t3, and an error occurs at the timing t4. Thus, the dc motor 2 generates electromotive force after the timing t2. When the averaged voltage V2 exceeds the target driving voltage V1 corresponding to the control command Sa, the operation processing circuit 14 stops outputting the control signal Sb at a timing t2. At the timing t3, the driving force to the fan 50 due to the traveling wind becomes zero, and thus when the driving voltage becomes smaller than the target driving voltage V1, the operation processing circuit 14 restarts outputting of the control signal Sb at a timing t3.

During the interval (from the timing t2 to the timing t3) for which the operation processing circuit 14 stops outputting the control signal Sb, the transistor Tr1 is not driven, so that the junction point voltage detection signal Sd supplied to the driving signal conversion circuit 26 is maintained at a constant voltage (high if the current passage is normal). Thus, the driving condition signal Se supplied to the AND gate 30 is high. On the other hand, the control condition signal Sc from the control signal conversion circuit 22 is low. As the result, the output of the AND gate 30 remains low.

When an error such as disconnection or short circuit occurs on the current path from the battery 4 to the transistor Tr1 via the dc motor 2 while the operation processing circuit 14 outputs the control signal Sb, the junction point voltage detection signal Sd is maintained low due to the presence of the resistor R1. As the result the output from the driving signal conversion circuit 26 becomes low, so that the driving condition signal Se supplied to the AND gate 30 becomes high.

Thus, when an error occurs on the current path to and from the dc motor 2, the AND gate 30 outputs the detection signal Sf (high) indicating the error on the current path.

In response to the detection signal Sf from the AND gate 30 at the timing t5, the interval monitoring circuit 32 judges the detection signal Sf is continuously outputted while the judging interval Td has passed. If the detection signal Sf is continuously outputted for the judging interval Td at a timing t6, the interval monitoring circuit 32 judges that the error surly occurs on the current path and outputs the judgment signal Sg indicating the error. In response to the judgment signal Sg, the alarm outputting circuit 18 supplies an alarm signal Sh to an external alarm unit to inform the driver of the error.

Figure 2:
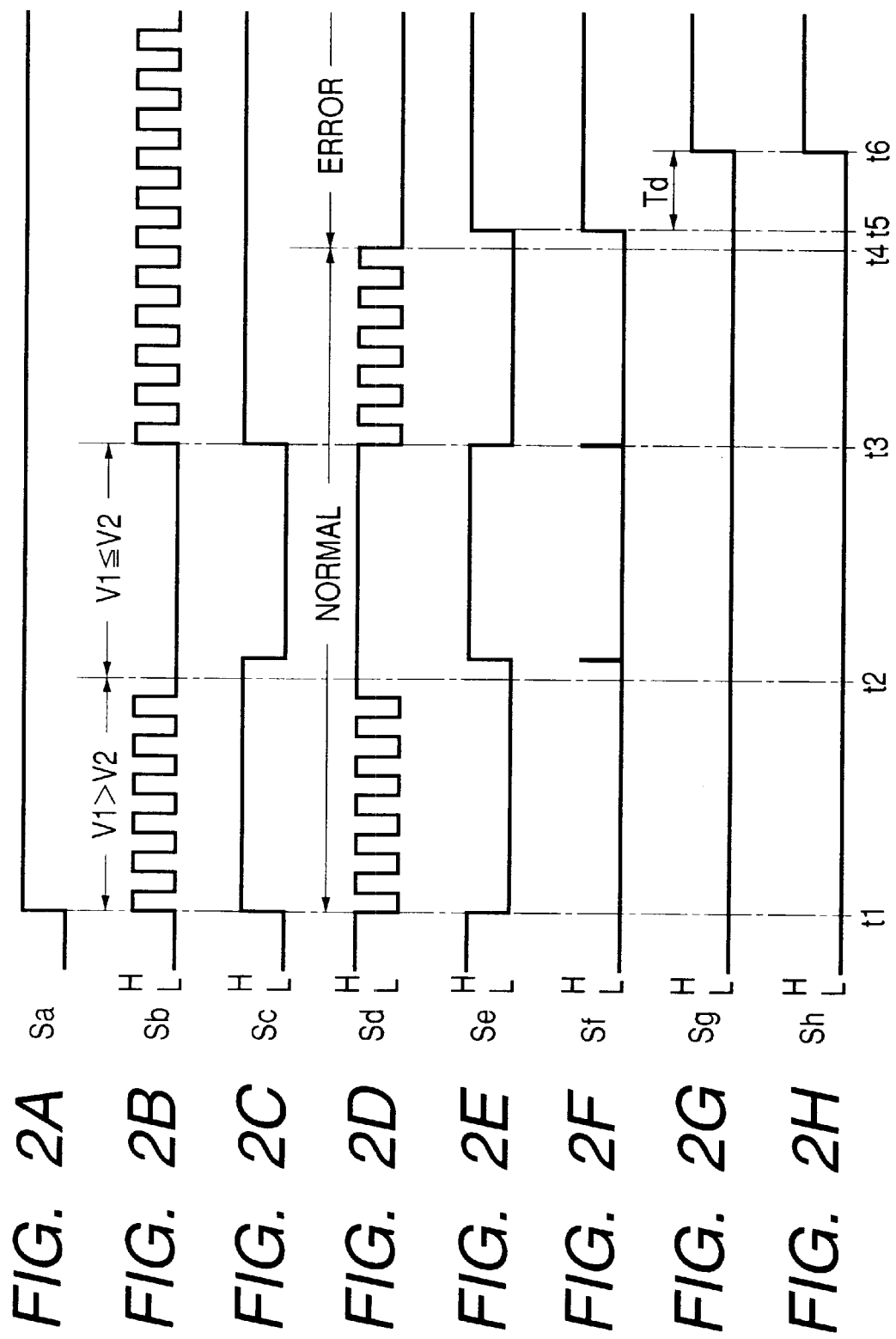
FIGS. 2A to 2H show waveforms of respective signals in the motor driving apparatus according to the first embodiment.

In the above-mentioned operation, the interval monitoring circuit 32 generates the judgment signal Sg indicating an error in the current path if the AND gate 30 outputs the detection signal Sf is outputted and then, this condition remains for the judgment interval Td. This reason is as follows:

As shown in FIG. 2F, at transition timings of the control condition signal Sc and the driving condition signal Se, the control condition signal Sc and the driving condition signal Se may go high at the same time due to delay in the control signal conversion circuit 22, the buffer circuit 24, the driving signal conversion circuit 26, the inverter 28, so that the AND gate 30 may temporarily output the detection signal Sf of high level. Moreover, due to external noise the AND gate 30 may temporarily go high. Then, in this embodiment, the output of the AND gate 30 is not used as the judgment signal indicating error in the current path. Thus, the interval monitoring circuit 32 monitors the interval of the detection signal Sf and generates the judgment signal Sg indicating error in the current path when the interval reaches the judgment interval Td.

More specifically, delays in the control signal conversion circuit 22 and the driving signal conversion circuit 26 largely vary. The delays may become several or more pulses of the control signal Sb. Thus, the judgment interval Td in the interval monitoring circuit 32 is determined in the range from several pulses to tens pulses of the control signal Sb.

As mentioned above, according to this embodiment, the motor driving apparatus 10 detects the junction voltage detection signal Sd at the junction point between the transistor Tr1 and the dc motor 2, judges whether the detection voltage Sd varies in the same manner as the control signal Sb (correspondingly varies), that is, the variation in the detection signal tracks that in the control signal Sb. This prevents erroneous error judgment in the case that the cooling fan 50 is rotated by the wind generated by traveling of the vehicle.

Moreover, in the motor driving apparatus 10 according to this embodiment, the resistor R1 is connected in parallel to the transistor Tr1. This prevents the driving signal conversion circuit 26 from erroneous judging the variation in the control signal Sb because the junction voltage Sd varies in accordance with the variation in the control signal Sb due to floating condition if the resistor R1 is absent. Thus, the resistor R1 improves the judging accuracy in judging the error in the current path.

Moreover, in this embodiment, the interval monitoring circuit 32 monitors duration of the detection signal Sf indicating error in the current path. If the duration interval reaches the judgment interval Td, the interval monitoring circuit 32 supplies the judgment signal Sg to the alarm output circuit 18. Thus, erroneous judgment due to delay in the detection signal or the like and noise can be prevented.

Figure 3:
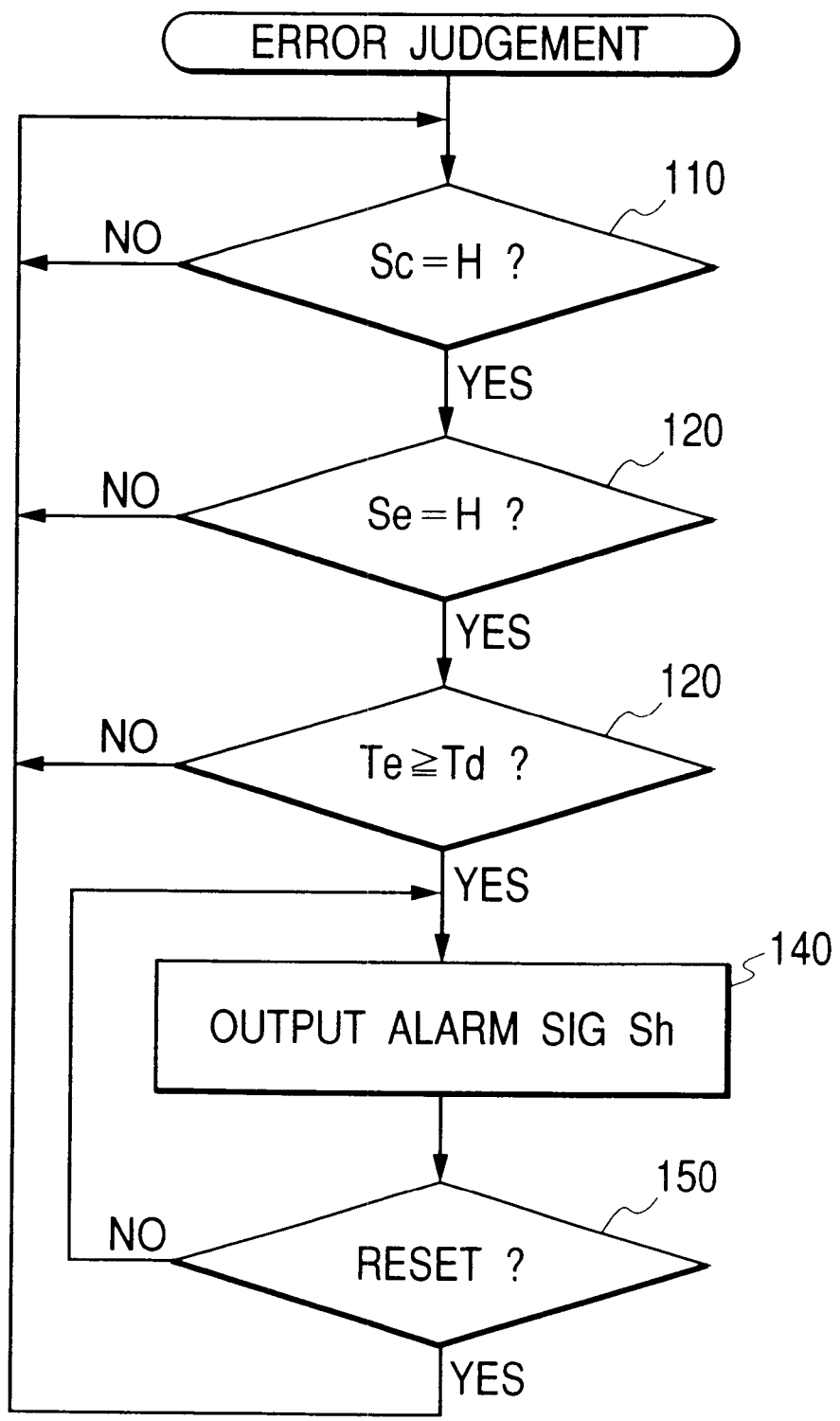
FIG. 3 depicts a flow chart of a portion of the error detection operation provided with a microprocessor originally provided for controlling a motor vehicle according to the first embodiment.

In the above-mention embodiment, the disconnection/shorting detection circuit 20 is provided with a discrete circuit including the inverter 28 and the AND gate 30. However, it is also possible to provide the above-mentioned operation with a microprocessor 162. FIG. 3 depicts a flow chart of a portion of the error detection operation provided with a microprocessor 162 originally provided for controlling a motor vehicle.

The outputs of the control signal conversion circuit 22 and the inverter 28 are supplied to the microprocessor 162 originally provided for controlling the motor vehicle.

The microprocessor 162 judges whether the control condition signal Sc is high in step 110 to judge whether the dc motor 2 is being driven. If the control condition signal Sc is high, that is, the dc motor 2 is being driven (YES in step 110), the microprocessor 162 judges whether the driving condition signal Se is high. If the driving condition signal Se is high, (YES in step 120), the microprocessor 162 judges whether the interval Te for which the driving condition signal Se goes high exceeds the judgment interval Td. If the interval Te exceeds the judgment interval Td, (YES in step 130), the microprocessor 162 supplies the alarm signal Sh to the external alarm unit in step 140. As mentioned above, the microprocessor 162 executes a portion of the error detections operation in place of the AND gate 30 and the interval monitoring circuit 32.

Moreover, after step 140, the microprocessor 162 detects whether a reset signal is inputted in step 150. If the reset signal is inputted, the process returns to step 110 without further generating the alarm signal Sh. If the reset signal is not inputted, processing returns to step 140 to generate the alarm signal Sh. This step is provided for that the driver has repaired the dc motor 2. That is, if the driver repairs the dc motor 2 or the current path when the driver is informed of the error on the current path from the battery 4 to the transistor Tr1 via the dc motor 2. The driver can stop the alarm by inputting the reset signal and restart the error detection operation again.

In the above-mentioned embodiment, when the disconnection/shorting detection circuit 20 judges the error on the current path to the dc motor 2, the disconnection/shorting detection circuit 20 supplies the judgment signal Sg indicating the error to the alarm output circuit 18. In response to this, the alarm outputting circuit 18 supplies the alarm signal Sh to the eternal alarm unit to inform the driver of the error. However, when the error occurs on the current path to the dc motor 2, it is impossible to rotate the dc motor 2 by controlling the transistor Tr1. Then, there is a modification that the judgment signal Sg is supplied to the input processing circuit 12 or the operation processing circuit 14 to stop supplying the drive signal to the dc motor 2.

This eliminates loss in switching the transistor Tr1 to same unnecessary power consumption.

Similarly, in the operation by the microprocessor 162, the processing in step 140 is modified as follows:

In addition to outputting the alarm signal Sh, the microprocessor interrupts inputting the control command Sa. This operation provides the same result.

[Second Embodiment]

This invention is applied to the motor driving apparatus for driving a plurality of dc motors.

Figure 4:
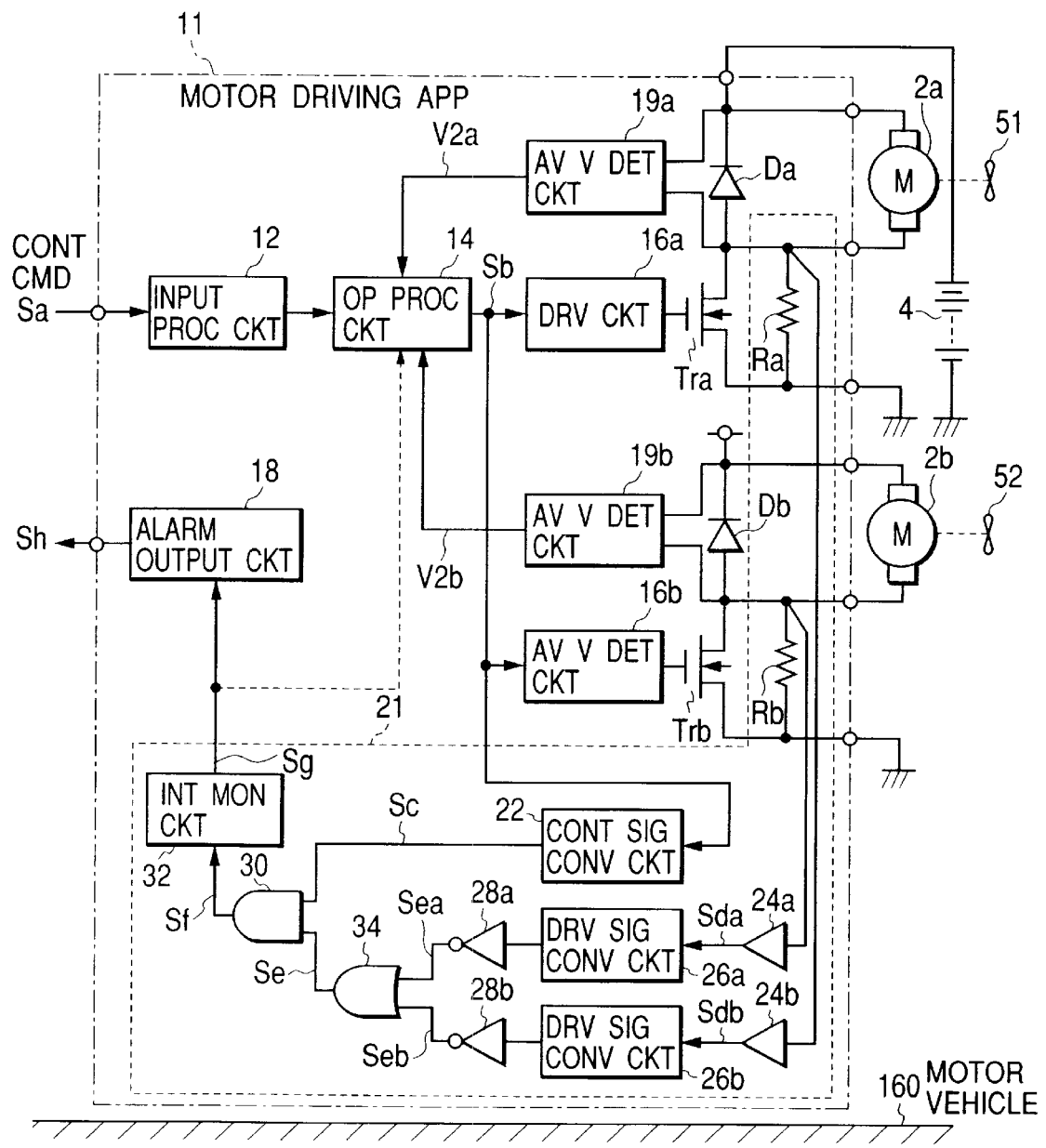
FIG. 4 a block diagram of a motor driving apparatus according to a second embodiment.

FIG. 4 is a block diagram of a motor driving apparatus 11 according to a second embodiment.

The motor driving apparatus 11 is provided for driving two dc motors 2a and 2b at the same time for rotating two cooling fans 51 and 52 provided for a motor vehicle engine. The motor driving apparatus 11 includes switching elements Tra and Trb comprising n-channel MOSFETs as low side switches on the current paths to the dc motors 2a and 2b from the battery 4 and diodes Da and Db connected to the dc motors 2a and 2b, respectively.

Moreover, the motor driving apparatus 11 includes the input processing circuit 12, the operation processing circuit 14, and the average voltage detection circuits 19a and 19b for detecting averaged driving voltage V2a and V2b supplied to the dc motors 2a and 2b, respectively, driving circuits 16a and 16b for turning on and off the transistors Tra and Trb in response to the control signal Sb from the operation processing circuit 14, respectively, and alarm outputting circuit 18 for outputting the alarm signal Sh.

Here, the operation processing circuit 14 generates a control signal (PWM signal) Sb so that the drive voltages V2a and V2b agree with the target driving voltage. However, if electromotive force is generated, and either of the driving voltage V2a or V2b exceeds the target driving voltage V1, the operation processing circuit 14 stops outputting the control signal Sb to turn off the transistor Tr1 to stop supplying current to the dc motors 2a and 2b.

The motor driving apparatus 11 also includes a disconnection/shorting circuit 21 for detecting disconnection or shorting in the current paths to the dc motor 2a and 2b from the battery 4.

The disconnection/shorting detection circuit 21, as same as the first embodiment, includes the control signal conversion circuit 22, the AND gate 30, and the interval monitoring circuit 32 and further includes resistors Ra and Rb connected in parallel to the transistors Tra and Trb (more specifically, between drain and source), respectively, driving signal conversion circuit 26a and 26b, and inverters 28a and 28b, and an OR circuit 34. The output of the OR gate 34 is supplied to the AND gate 30 together with the control condition signal Sc from the control signal conversions circuit 22.

The driving signal conversion circuit 26a is supplied with the voltage (voltage signal) at the junction point between the transistor Tra and the motor 2a, detects the cycle of variation in the voltage signal at the cycle which is substantially the same as that of the control signal Sb, and outputs a driving condition signal (high) Sda indicating that the dc motor 2a is driven by the transistor Tra with duty control when the junction voltage detection signal Sd varies at the cycle that is substantially same as that of the control signal Sb from the operation processing circuit 14, that is, the voltage signal Sda varies with tracking the control signal Sb.

The driving signal conversion circuit 26b is supplied with the voltage (voltage signal) at the junction point between the transistor Trb and the dc motor 2a, detects the cycle of variation in the voltage signal at the cycle which is substantially the same as that of the control signal Sb, and outputs a driving condition signal (high) Sdb indicating that the dc motor 2a is driven by the transistor Trb with duty control when the junction voltage detection signal Sdb varies at the cycle that is substantially same as that of the control signal Sb from the operation processing circuit 14, that is, when the voltage signal Sda varies with tracking the control signal Sb.

The inverters 28a and 28b invert the outputs of the driving signal conversion circuit 26a and 26b, respectively. The OR gate 34 outputs the driving condition signal Se when any of the outputs of the inverters 28a and 28a is high.

As same as the first embodiment, the resistors Ra and Rb are provided for preventing the junction voltage detection signals Sda and Sda from varying when the current path to the dc motors 2a or 2b is disconnected. The resistance values are so large that the dc motors 2a and 2b do not rotate by the currents flowing through the resistors Ra and Rb when the transistors Tra and Trb turn off while the current paths to the dc motor 2 are normal, respectively.

When the control command Sa is supplied from an external control unit, the operation processing circuit 14 starts generating the PWM signal for rotating the dc motors 2a and 2b at rotating speeds corresponding to the control command Sa as a control signal Sb supplied to the driving circuits 16a and 16b. As the result, the transistors Tra and Trb turn on and off at the predetermined cycle on the basis of the control signal Sb, respectively. If the current paths to the dc motors 2a and 2b are normal, the junction voltage detection signals Sda and Sdb supplied to the driving signal conversion circuits 26a and 26b cyclically vary with the control signal Sb.

In this condition, the driving condition signals Sea and Seb supplied to the OR gate 34 become low, so that the AND gate 30 is supplied with the driving condition signal Se of low and the control condition signal Sc of high. Thus, the AND gate 30 outputs low level. That is, the AND gate 30 does not output the detection signal Sf of high indicating error on the current paths.

When an error such as disconnection or shorting occurs on any of the current paths to the dc motors 2a and 2b while the operation processing circuit 14 outputs the control signal Sb, any of the driving signal conversion circuit 26a or 26b corresponding to the error becomes high. As the result, the OR gate 34 supplies the driving condition signal Se of high to the AND gate 30, so that the AND gate 34 outputs the detection signal Sf of high.

In response to the detection signal Sf from the AND gate 30, the interval monitoring circuit 32 judges the detection signal Sf is continuously outputted while the judging interval Td has passed. If the detection signal Sf is continuously outputted for the judging interval Td, the interval monitoring circuit 32 judges that the error surly occurs on any of current paths and outputs the judgment signal Sg indicating the error. In response to the judgment signal Sg, the alarm outputting circuit 18 supplies an alarm signal Sh to an external alarm unit to inform the driver of the error.

When this condition continues for more than the judgment interval Td, the interval monitoring circuit 32 supplies the judgment signal Sg indicating an error on the current path to the alarm output circuit 18 which supplies the alarm signal Sh to an external alarming unit. Thus, the motor driving apparatus 11 according to this embodiment can immediately inform the error on the current path of any of dc motors 2a and 2b.

Moreover, in the condition that the current paths for the dc motors 2a and 2b are normal, if any of the driving voltages V2a and V2b exceeds the target driving voltage because the dc motor 2a and 2b generate electromotive forces by further rotating in the forward direction by the wind due to traveling while the dc motors 2a and 2b are driven, the operation processing circuit 14 stops outputting the control signal Sb. This remains the control condition signal Sc low, so that the detection signal does not go high. This provides accurate judgment of the error on the dc motors 2a and 2b in any driving condition of the dc motors 2a and 2b.

Moreover, the motor driving apparatus 11 according to this embodiment drives the motors 2a and 2b at the same time in response to the command control command Sa. Thus, though either of current path of the dc motors 2a or 2b is disconnected or shorted, the dc motor 2a or 2b that is free from the error can be continuously driven by supplying the driving signal to the dc motor 2a or 2b. Therefore, the motor driving apparatus 11 according to this embodiment prevents the engine from overheating due to stop of the cooling fan 51 or 52, so that safety can be improved.

Further, as shown in FIG. 4, the interval monitoring circuit 32 may supplies the judgment signal Sg to the operation processing circuit 14 in addition to the alarm output circuit 18 through the signal passage shown by the chain line. In this case, the operation processing circuit 14 makes the pulse width of the control signal Sb greater than that in the normal condition in response to the judgment signal Sg to increase the current to the dc motor 2a or 2b that is in the normal condition.

This structure rotates the dc motor 2a or 2b of which current path is normal at a higher rotation speed than that in the normal condition if an error occurs on either of current path. This suppresses decreasing in the cooling performance for the engine. That is, overheat of the engine can be surely prevented. Moreover, the higher rotation speed of the dc motor 2a or 2b generates sound noise at a higher level, which also informs the driver of the error.

This invention has been described with the above-mentioned embodiments. However, this invention is not limited to the scope of the above-mentioned embodiments, but includes various modifications.

For example, in the above-mentioned embodiments, the motor driving apparatus including the switching elements (transistors Tr1, Tra, and Trb) provided between the dc motors 2, 2a, and 2b and the ground as the so-called low-side switches. However, this invention is applicable to the motor driving apparatus including the switching elements provided between the positive electrode of the dc power supply and the dc motors 2, 2a, and 2b as the so-called high-side switch. This structure provides the same operation. Moreover, p-channel MOSFETs can be used as the switching elements in addition to the n-channel MOSFET in the above-mentioned embodiment. Further, bipolar transistors such as NPN transistors or PNP transistors can be used as the switching elements.

Figure 5A:
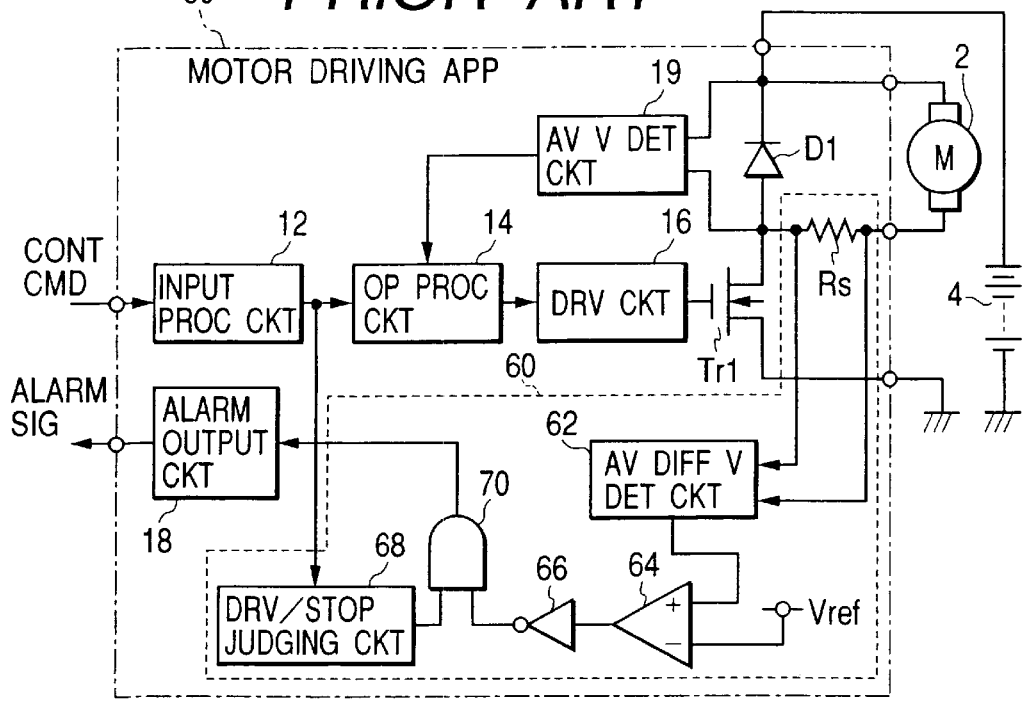
FIG. 5A is a block diagram of a prior art motor driving apparatus having a current detection resistor.
Figure 5B:
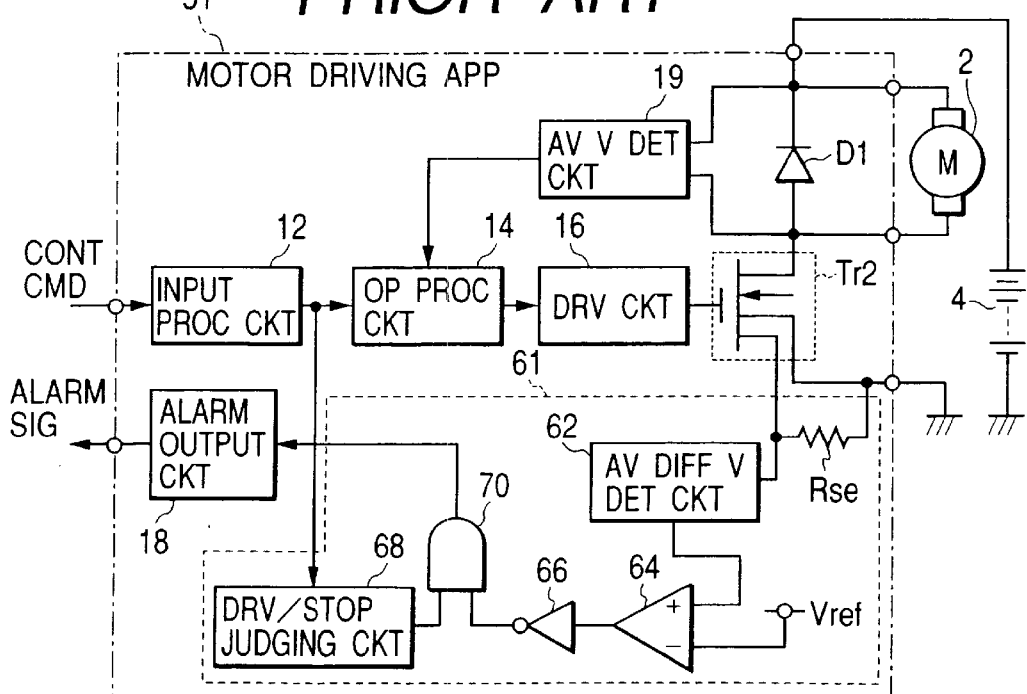
FIG. 5B is a block diagram of another prior art motor driving apparatus.

In the above-mentioned embodiments, the voltage supplied to the disconnection/shorting detection circuits 20 or 21 is supplied from the junction point between the dc motor 2, 2a, or 2b and the transistor Tr1, Tra, or Trb. However, there are modifications for this structure. For example, if noise filters including L (coil element) and C elements for reducing the brush noise are provided between the dc motors 2, 2a, and 2b and the transistors Tr1, Tra, and Trb, the voltage of either end of the coil or voltages of both ends of the coil element may be supplied to the disconnection/shorting detection circuit 20 or 21. Moreover, if a motor current detection resistor shown in FIG. 5A is provided between the dc motor 2, 2a, or 2b and the transistor Tr1, Tra, or Trb, the voltage at either of ends of the resistor or voltages at both ends may be supplied to the disconnection/shorting detection circuit 20 or 21. That is, this invention is applicable to the circuit structure that can supply the voltage signal on the current path to or from the dc motor 2, 2a, or 2b to the disconnection/shorting detection circuit 20 or 21.

What is claimed is:

1. A dc motor driving apparatus comprising:
   switching means provided at a first current path between a dc power supply and a dc motor;
   control means for generating a pulse width modulation signal to turn on and off said, switching means in response to a control signal;
   detection means for detecting a voltage at a second current path between said dc motor and said switching means, said first current path including said second current path; and
   judging means for judging whether said voltage from said detection means and said pulse width modulation signal vary at substantially the same cycle and judging that there is an error on a third current path from said dc power supply to said switching means via said dc motor when said voltage from said detection means and said pulse width modulation signal do not vary at substantially the same cycle.

2. A motor driving apparatus as claimed in claim 1, further comprising a resistor connected in parallel with said switching means, wherein a resistance of said resistor is determined such that a current flowing through said resistor does not rotate said dc motor when said switching means is in an OFF condition.

3. A motor driving apparatus as claimed in claim 1, wherein said judging means comprising:
   first judging means for judging whether variation in said voltage from said detection means tracks variation in a voltage of said control signal; and
   second judging means for monitoring an interval for which said variation of said detection voltage does not track said control signal and judging that there is said error on a current path from said dc power supply to said switching means via said dc motor when said interval exceeds a predetermined judging interval.

4. A motor driving apparatus as claimed in claim 1, wherein said dc motor is mounted on a mobile unit and provided for rotating a fan which is further rotated by a wind generated by movement of said mobile unit.

5. A dc motor driving apparatus as claimed in claim 1, further comprising a plurality of motor control circuit, each including said switching means, said control means, and said detection means, and wherein said judging means judges that there is an error on any of said third current paths from said dc power supply to said switching means via dc motors in said motor control circuits when said voltage from said detection means and said pulse width modulation signal in any of said motor control circuits do not vary at substantially the same cycle.

6. A motor driving apparatus as claimed in claim 5, wherein said dc motors are mounted on a mobile unit and provided for rotating fans, respectively, which are further rotated by wind generated by movement of said mobile unit.

7. In a motor driving apparatus comprising:
   switching means provided at a first current path between a dc power supply and a dc motor;
   control signal generating means in response to a control signal for setting a target driving voltage for said dc motor and generating a pulse width modulation signal for controlling a driving voltage for said dc motor toward said target driving voltage as a control signal; and
   driving means for rotating said dc motor by turning on and off said switching means in accordance with said control signal, the improvement comprising;
   detection means for detecting a voltage at a second current path between said dc motor and said switching means, said first current path including said second current path; and
   judging means for judging whether said voltage from said detection means and said pulse width modulation signal vary at substantially the same cycle and judging that there is an error on a third current path from said dc power supply to said switching means via said dc motor when said voltage from said detection means and said pulse width modulation signal do not vary at substantially the same cycle.

8. A motor driving apparatus comprising:
   switching means provided at a first current path between a dc power supply and a dc motor;
   control means for generating a pulse width modulation signal to turn on and off said switching means in response to a control signal;
   detection means for detecting a voltage at a second current path between said dc motor and said switching means, said first current path including said second current path; and
   judging means for judging whether said voltage from said detection means and said pulse width modulation signal correspondingly vary with each other in a variation cycle and judging that there is an error on a third current path from said dc power supply to said switching means via said dc motor when said voltage from said detection means and said pulse width modulation signal does not correspondingly vary with each other in said variation cycle.

9. A motor driving apparatus comprising:
   switching means provided at a first current path between a dc power supply and a dc motor;

control means for generating a pulse width modulation signal to turn on and off said switching means in response to a control signal;

detection means for detecting a voltage at a second current path between said dc motor and said switching means, said first current path including said second current path; and judging means for judging whether a variation in said voltage from said detection means tracks a variation in said pulse width modulation signal and judging that there is an error on a third current path from said dc power supply to said switching means via said dc motor when said variation in said voltage from said detection means does not track said variation in said pulse width modulation signal.

* * * * *